(No Model.)
W. C. HOMAN.
SUSPENSION DEVICE FOR LAMPS.
No. 408,975. Patented Aug. 13, 1889.
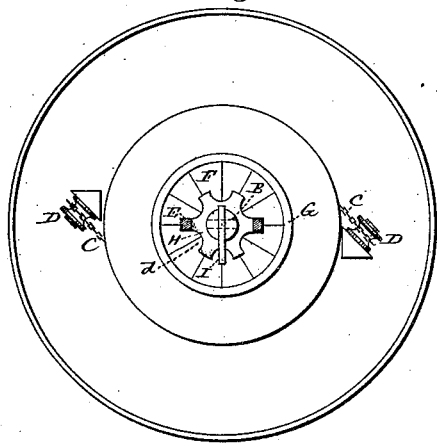
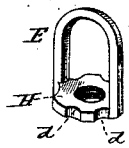
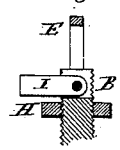
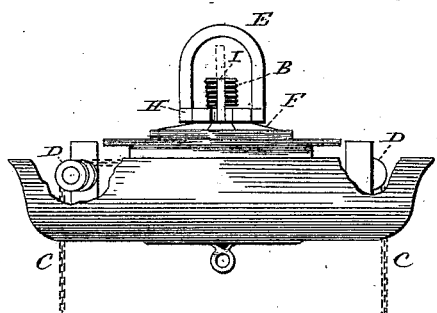
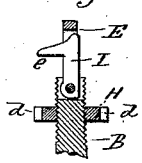
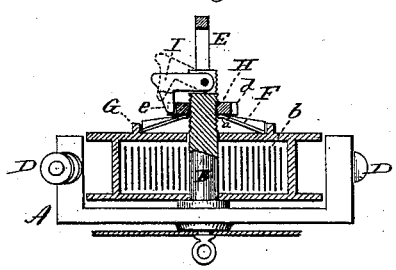
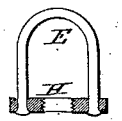
Witnesses:
William C. Homan,
Inventor.
By Atty.

UNITED STATES PATENT OFFICE.

WILLIAM C. HOMAN, OF MERIDEN, CONNECTICUT, ASSIGNOR TO THE EDWARD MILLER & COMPANY, OF SAME PLACE.

SUSPENSION DEVICE FOR LAMPS.

SPECIFICATION forming part of Letters Patent No. 408,975, dated August 13, 1889.

Application filed March 25, 1889. Serial No. 304,652. (No model.)

*To all whom it may concern:*

Be it known that I, WILLIAM C. HOMAN, of Meriden, in the county of New Haven and State of Connecticut, have invented new Improvements in Suspension Devices for Lamps; and I do hereby declare the following, when taken in connection with accompanying drawings and the letters of reference marked thereon, to be a full, clear, and exact description of the same, and which said drawings constitute part of this specification, and represent, in—

Figure 1, a top or plan view with the upper portion of the suspending loop cut away; Fig. 2, a side view of the same, a portion of the canopy removed to show the frame and pulleys; Fig. 3, a vertical section showing the frame in side view; Fig. 4, a perspective view of the disk-spring detached; Fig. 5, a perspective view of the hanger detached; Fig. 6, a detached view to illustrate the operation of the dog; Fig. 7, a modification in the dog; Fig. 8, a modification in the disk-spring; Fig. 9, a modification of the suspending loop and nut.

This invention relates to an improvement in that class of suspension devices for lamps in which a spring-drum is arranged in a canopy suspended from the ceiling, and upon which drum chains are wound and extending therefrom to the fixture below, so that as the fixture is drawn downward the chains will be drawn from the drum and impart rotation to the drum to wind the spring, and so that when free the reaction of the spring will produce the rotation of the drum in the opposite direction and rewind the chains thereon, the invention being specially adapted to this class of suspension devices in which the drum is arranged upon a vertical axis and so as to revolve in a horizontal plane.

The suspension devices are sold as articles of manufacture independent of the fixture to be supported. The fixtures vary in weight, and a fixture itself with its lamp will vary in weight to a considerable extent, owing to the consumption of the oil—that is, whether the fount be full or not, or whether there be a shade applied to the fixture or not. If the spring be set so as to support a fixture of a given weight, any considerable variation from that given weight will affect the operation of the spring—that is, if the fixture be heavier than that for which the spring is adjusted the spring will not support the fixture as it should do, but the fixture will be liable to run down of its own weight. On the contrary, if the fixture be lighter, then the natural reaction of the spring would draw up the lamp, so that in either case it would be supported only at substantially the extreme position. Some device is therefore necessary to overcome this variation in weights. A common device for this purpose is a constant friction applied to the drum, which equally opposes the rotation of the drum in either direction, the friction being sufficiently great to hold the drum, notwithstanding a considerable variation in the weight of the fixture or thing suspended. These frictional devices are made adjustable, so as to be increased or diminished, as occasion requires, that the suspension device may possess in itself the capacity of being adjusted to support articles of various weights. It is to this construction of suspension devices that my invention particularly relates, it having for its object a simple and convenient means for adjusting the friction, and which, when once adjusted, is not liable to disadjustment; and it consists in the construction as hereinafter described, and particularly recited in the claims.

A represents the frame; B, the vertical spindle or axle, on which the drum $b$ is arranged. The spring in the drum is of usual arrangement, one end being attached to the drum and the other to the spindle, the spindle being held stationary in the frame, and so that as the drum is rotated in one direction it will wind the spring, and then when free the reaction of the spring will cause the drum to revolve in the opposite direction—a common and well-known device.

Chains C C are wound upon the drum—one from one side and the other from the opposite side—and pass over pulleys D D, thence downward to the thing to be suspended. The spindle B is provided with a hanger E, which is in the form of a loop, by which the device may be hung to the ceiling or wherever it is desired.

Upon one end of the drum a disk-spring F is arranged to bear frictionally. This spring is made from elastic metal, and is corrugated, the corrugations being radial, as seen in Fig. 4, and extending from the outer edge inward, but so as to leave a flat center $a$. The disk-spring is slightly conical or concavo-convex, the concave side being toward the drum, and the drum is preferably constructed with a concentric flange G, forming a recess in the end of the drum, within which the disk-spring F rests.

The spindle B extends through the spring, and is screw-threaded. The hanger or loop E is constructed at its lower end to form a nut II, (see Fig. 5,) threaded corresponding to the screw-thread of the spindle, and so as to work thereon as a nut. Turning the loop or hanger in one direction will bring the nut to bear upon the center of the disk-spring F and force that spring to a closer or harder bearing upon the drum, and so as to increase the friction between the drum and the spring.

If it is desired to increase the friction upon the drum, the nut II is rotated in the direction to take it toward the drum and increase its bearing upon the spring F, or, if a lighter pressure is required, then the nut is turned in the opposite direction.

As the hanger is attached to the ceiling by a hook or frictional device, it cannot rotate; but unless some device were introduced to prevent it the frame carrying the drum would be free to rotate, and such rotation would withdraw the spindle from the nut or take it farther into it, according to the direction in which the frame might be turned; hence the friction would be liable to accidental variation.

To interlock the nut II with the frame, so as to prevent its accidental rotation, I hinge a dog I in the spindle, so as to swing in a vertical plane, as seen in Fig. 3, and construct the edge of the nut II with one or more recesses or teeth $d$, with which the nose $e$ of the dog may engage, as seen in Fig. 3, but so that when the dog is turned upward from the nut the nut will be free to revolve. As the nut is made a part of the loop, and in order to permit the loop to revolve, the dog is of a size so as to turn up into the loop, as indicated in broken lines, Fig. 2, and as also seen in Fig. 6, and the size of the dog is less than the opening through the loop, so that when the dog is turned to its up position and into line with the spindle B, as represented in Fig. 6, the loop E, with the nut II, may be rotated to the desired position, and then the dog turned down into engagement with the nut will prevent the rotation of the loop, and so that, normally suspended, there is no liability of a disadjustment of the frictional device; but if at any time it be desired to vary the friction the dog may be turned up into the loop and the nut rotated accordingly. When the dog is engaged with the nut, its rotation is impossible. By making several notches or teeth in the periphery of the nut a nice adjustment may be attained; but this engagement is not necessary in order to permit adjustment, as the dog may be simply a straight dog hung in the end of the spindle, as seen in Fig. 7, and so as to swing out through the loop, and of a length sufficient to prevent the rotation of the loop; but when turned to the up position, as before described, the loop with the nut would be free to be turned. Under this arrangement the nut would be held within certain limits of rotation, but would not insure so perfect and constant adjustment as is attained by constructing the nut with the notches with which the dog may engage.

Instead of making the disk-spring corrugated it may be made a plain concavo-convex disk, as represented in Fig. 8, and, if preferred, the edges of the disk may be slit radially, so as to give a greater degree of elasticity to the edge of the disk.

While I prefer to make the loop and nut as in one integral casting, it will be evident that they may be made in separate parts and united, as seen in Fig. 9, which represents the loop as made of U shape from wire, its ends extending through the nut and riveted therein.

I claim—

1. In a suspension device for lamps and like articles, the combination of a frame, a vertical stationary spindle in said frame, a spring-drum arranged upon said spindle, one end of the spring engaged with the drum and the other with the spindle, the spindle extending through the drum, screw-threaded at its upper end, a disk-spring around said spindle and so as to bear upon the drum, a nut screw-threaded corresponding to the end of the spindle and adapted to bear upon the said disk-spring, the nut constructed as a part of a suspending loop, the loop open above the end of the spindle, and a dog hung in the end of the spindle so as to swing in a vertical plane through the open spindle and adapted to engage said nut, substantially as described.

2. The combination of a frame, a vertical spindle stationary in said frame, a spring-drum arranged on said spindle, one end of the spring fixed to the spindle and the other to the drum, a disk-spring arranged around the spindle and so as to bear upon the end of the drum, the upper end of the spindle screw-threaded, a nut screw-threaded corresponding to the end of the spindle and adapted to bear upon said disk-spring, a suspending loop made as a part of said nut, the periphery of the said nut constructed with one or more notches, and a dog hung in the upper end of the spindle above the nut and so as to swing in a vertical plane within the hanging loop, the dog constructed with a nose adapted to engage a notch in the said nut, substantially as described.

3. The combination of the frame A, the spindle B, stationary in said frame, spring-drum $b$, arranged upon said spindle, the disk-spring F, corrugated radially and arranged around said spindle and adapted to bear upon the end of the drum, the spindle extending through said spring and screw-threaded, and a nut H, having a loop E as a part thereof and extending above the said spindle, with a dog I hung in the upper end of said spindle and so as to swing in a vertical plane within the said loop and adapted to engage said nut, substantially as described.

WM. C. HOMAN.

Witnesses:
 JOHN E. EARLE,
 FRED C. EARLE.